United States Patent
Panchal

(10) Patent No.: US 9,888,448 B2
(45) Date of Patent: Feb. 6, 2018

(54) INITIATING A TRANSMIT ANTENNA SWITCH DURING UPLINK-DOWNLINK IMBALANCE

(71) Applicant: Verizon Patent and Licensing Inc., Arlington, VA (US)

(72) Inventor: Jignesh S. Panchal, Hillsborough, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 104 days.

(21) Appl. No.: 14/923,595

(22) Filed: Oct. 27, 2015

(65) Prior Publication Data

US 2017/0118727 A1 Apr. 27, 2017

(51) Int. Cl.
*H04W 52/36* (2009.01)
*H04W 72/04* (2009.01)
*H04W 52/08* (2009.01)
*H04W 52/24* (2009.01)

(52) U.S. Cl.
CPC ......... *H04W 52/365* (2013.01); *H04W 52/08* (2013.01); *H04W 52/241* (2013.01); *H04W 72/0413* (2013.01)

(58) Field of Classification Search
CPC . H04W 52/365; H04W 52/08; H04W 52/241; H04W 72/0413
See application file for complete search history.

(56) References Cited

U.S. PATENT DOCUMENTS

| 2012/0134441 | A1* | 5/2012 | Yokomakura | H04B 7/063 375/295 |
| 2013/0225223 | A1* | 8/2013 | Nukala | H04W 52/241 455/522 |
| 2013/0315170 | A1* | 11/2013 | Dawid | H04B 7/0877 370/329 |
| 2016/0330750 | A1* | 11/2016 | Lee | H04W 48/20 |

OTHER PUBLICATIONS

Wikipedia, "Antenna diversity," https://en.wikipedia.org/wiki/Antenna_diversity, Apr. 7, 2015, 4 pages.
3rd Generation Partnership Project, "3GPP TS 36.101 V13.1.0: Technical Specification Group Radio Access Network; Evolved Universal Terrestrial Radio Access (E-UTRA); User Equipment (UE) radio transmission and reception (Release 13)," http://www.3gpp.org/ftp/specs/archive/36_series/36.101/, Oct. 9, 2015, 762 pages.

(Continued)

*Primary Examiner* — Rina Pancholi

(57) ABSTRACT

A device may determine that a first antenna of a user equipment is transmitting at a maximum transmission power value, and may determine a received signal power value associated with a wireless signal transmitted via the first antenna of the user equipment. The device may compare a target signal power value and the received signal power value, and may determine that a switching threshold value is satisfied. The device may provide, to the user equipment, an instruction to transmit via a second antenna based on determining that the switching threshold value is satisfied.

20 Claims, 4 Drawing Sheets

(56) References Cited

OTHER PUBLICATIONS

3rd Generation Partnership Project, "3GPP TS 36.133 V13.1.0: Technical Specification Group Radio Access Network; Evolved Universal Terrestrial Radio Access (E-UTRA); Requirements for support of radio resource management (Release 13)," http://www.3gpp.org/ftp/specs/archive/36_series/36.133/, Oct. 2, 2015, 1430 pages.

3rd Generation Partnership Project, "3GPP TS 36.213 V12.7.0: Technical Specification Group Radio Access Network; Evolved Universal Terrestrial Radio Access (E-UTRA); Physical layer procedures (Release 12)," http://www.3gpp.org/ftp/specs/archive/36_series/36.213/, Sep. 24, 2015, 241 pages.

\* cited by examiner

INITIATING A TRANSMIT ANTENNA SWITCH DURING UPLINK-DOWNLINK IMBALANCE

BACKGROUND

Closed loop power control enables a user equipment (UE) to adjust an uplink transmission power based on receiving transmit power control (TPC) commands from a base station. The base station may compare a received signal-to-interference-plus-noise-ratio (SINR) value to a target SINR value, and may transmit a TPC command requesting the UE to increase transmission power when the received SINR value is lower than the target SINR value.

DETAILED DESCRIPTION OF PREFERRED EMBODIMENTS

The following detailed description of example implementations refers to the accompanying drawings. The same reference numbers in different drawings may identify the same or similar elements.

A user equipment (UE), such as a long term evolution (LTE) user device, may incorporate multiple antennas that may be located at different positions in the UE. When holding the UE, a user of the UE may worsen uplink path loss by obstructing a transmit antenna of the UE (e.g., which may attenuate transmitted signals). A base station may compensate for the attenuated signals by transmitting transmit power control (TPC) commands to the UE, which may instruct the UE to increase a transmission power of the transmit antenna. However, in instances where the user of the UE is obstructing the transmit antenna to a significant degree and/or is located near a cell edge, the UE may already be transmitting at a maximum allowable transmission power. In such instances, the UE may establish an insufficient connection with the network, and service coverage (e.g., for a Voice over LTE (VoLTE) service) may become compromised and/or unavailable. Implementations described herein may allow a base station to detect communication issues associated with a transmit antenna of the UE, and to transmit an instruction to the UE to switch to a different antenna for transmission.

Figure 1:
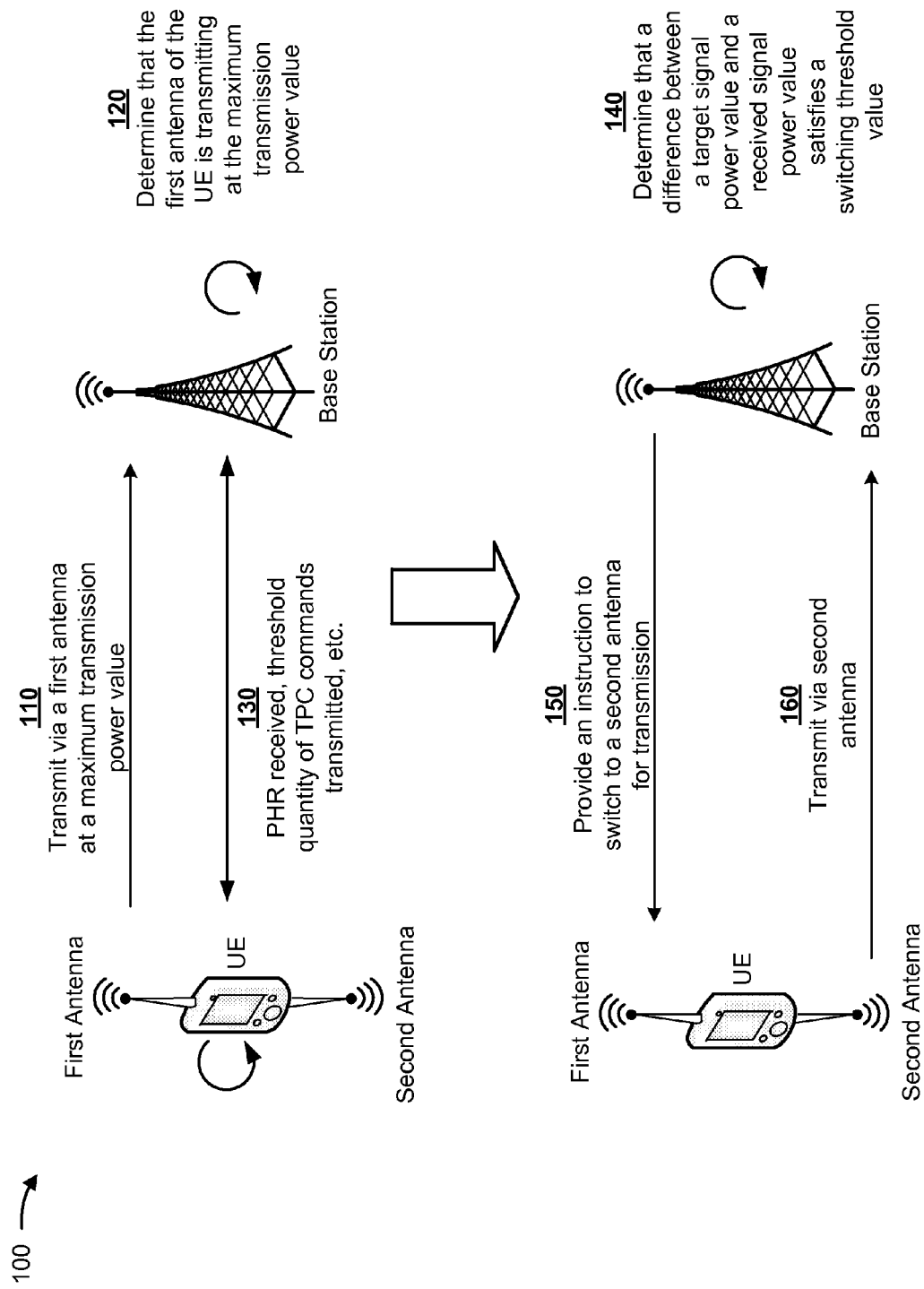
FIG. 1 is a diagram of an overview of an example implementation described herein.

FIG. 1 is a diagram of an overview of an example implementation 100 described herein. As shown in FIG. 1, example implementation 100 may include a UE, such as an LTE user device. As shown by reference number 110, the UE may transmit wireless signals, via a first antenna, at a maximum transmission power value. For example, assume that a user of the UE is located near a cell edge and/or is obstructing the first antenna. The obstruction of the first antenna may worsen uplink path loss, and may attenuate wireless signals transmitted via the first antenna (e.g., may cause an uplink-downlink imbalance where an uplink path loss is different from a downlink path loss). A base station may receive wireless signals from the UE and may determine received signal power values associated with the wireless signals, for example.

As shown by reference number 120, the base station may determine that the first antenna of the UE is transmitting at the maximum transmission power value. For example, and as shown by reference number 130, the base station may receive a power headroom report (PHR) from the UE, which may be periodically transmitted by the UE. In accordance with the Third Generation Partnership Project (3GPP) standard, the UE may not exceed a transmission power of 23 dBm. If the UE is transmitting at the maximum transmission power value, then the UE may transmit a PHR indicating that the UE cannot increase a transmission power of the first antenna (e.g., because the UE is already transmitting at 23 dBm). The base station may receive a PHR, and may determine that the first antenna of the UE is transmitting at the maximum transmission power value based on the PHR including a particular headroom value and/or range of headroom values (e.g., 0 dB, 0-3 dB, or the like).

As further shown by reference number 130, the base station may determine (e.g., infer) that the first antenna of the UE is transmitting at the maximum transmission power value based on transmitting a threshold quantity of transmit power control (TPC) commands. For example, the base station may receive an attenuated wireless signal from the UE, and may transmit a TPC command to the UE instructing the UE to increase the transmission power of the first antenna. This process may be repeated one or more times. However, if the UE is transmitting at the maximum transmission power value, then the UE may disregard the TPC command(s) from the base station. Additionally, or alternatively, the base station may use one or more other techniques to determine that the first antenna of the UE is transmitting at the maximum transmission power value, as described in more detail elsewhere herein.

As shown by reference number 140, the base station may determine that a difference between a target signal power value and a received signal power value satisfies a switching threshold value. For example, the target signal power value may include a signal power value required to maintain a channel quality associated with a particular service (e.g., a VoLTE service). Based on determining that the difference between the target signal power value and the received signal power value satisfies the switching threshold value, the base station may provide an instruction to the UE instructing the UE to switch to a second antenna for transmission, as shown by reference number 150. As shown by reference number 160, the UE may use the second antenna for future transmissions based on receiving the instruction.

In this way, the base station may detect communication issues associated with a first antenna of the UE, and may initiate a switch to a second antenna, thereby increasing channel quality and facilitating a more robust connection with the UE. Implementations described herein may conserve UE processor, memory, and/or battery resources by recognizing communication issues and establishing a more robust link. Further, network resources may be conserved by avoiding communication issues associated with low data throughput, dropped calls, or the like. Implementations described herein may help improve service coverage, and may reduce reliance on less efficient radio access technologies, thereby conserving network resources.

Figure 2:
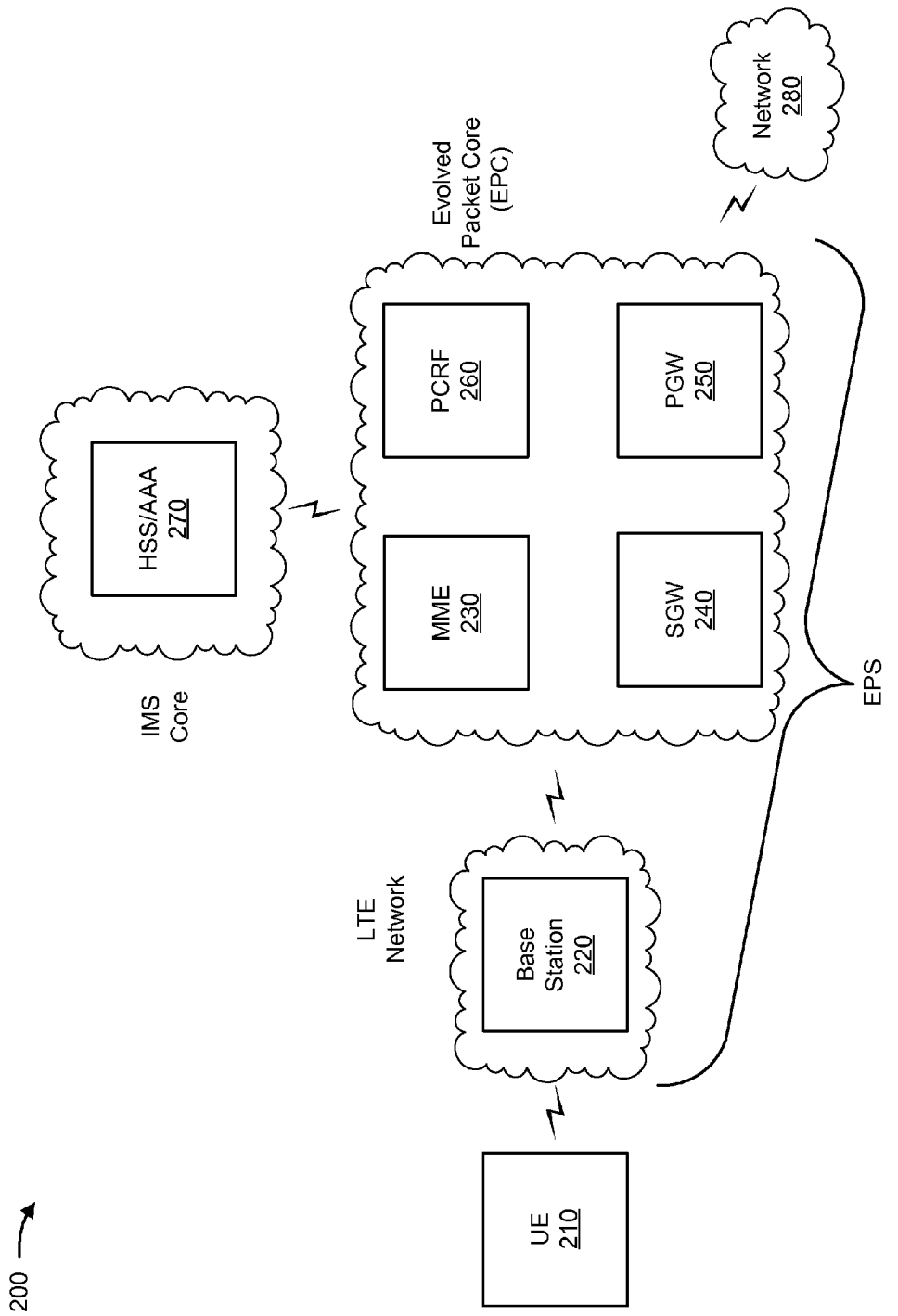
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a UE 210; a base station 220; a mobility management entity device (MME) 230; a serving gateway (SGW) 240; a packet data network gateway (PGW) 250; a policy charging and rules function server (PCRF) 260; a home subscriber service/authentication, authorization, and accounting server (HSS/AAA) 270; and a network 280. Devices of environment 200 may interconnect via wired connections, wireless connections, or a combination of wired and wireless connections.

Some implementations are described herein as being performed within a LTE network for explanatory purposes. Some implementations may be performed within a network that is not an LTE network, such as a third generation (3G) network or a code division multiple access (CDMA) network.

Environment 200 may include an evolved packet system (EPS) that includes an LTE network and/or an evolved packet core (EPC) that operate based on a 3GPP wireless communication standard. The LTE network may include a radio access network (RAN) that includes one or more base stations 220 that take the form of evolved Node Bs (eNBs) via which UE 210 communicates with the EPC. The EPC may include MME 230, SGW 240, PGW 250, and/or PCRF 260 that enable UE 210 to communicate with network 280 and/or an Internet protocol (IP) multimedia subsystem (IMS) core. The IMS core may include HSS/AAA 270, and may manage device registration and authentication, session initiation, etc., associated with UEs 210. HSS/AAA 270 may reside in the EPC and/or the IMS core.

UE 210 may include one or more devices capable of connecting to a network via base station 220. For example, UE 210 may include a communication device, such as a mobile phone (e.g., a smart phone, a radiotelephone, etc.), a tablet computer, a wearable communication device (e.g., a smart wristwatch, a pair of smart eyeglasses, etc.), or a similar type of device. UE 210 may include multiple antennas (e.g., multiple transmit antennas) for communicating with base station 220. UE 210 may transmit wireless signals via one or more of the antennas, may receive wireless signals via one or more of the antennas, and/or may both transmit and receive wireless signals via one or more of the antennas. In some implementations, UE 210 may switch transmission and/or reception capabilities among the antennas. UE 210 may send traffic to and/or receive traffic from network 280 via base station 220 (e.g., based on a radio access bearer between UE 210 and SGW 240).

Base station 220 may include one or more devices capable of transferring traffic, such as audio, video, text, and/or other traffic, destined for and/or received from UE 210. In some implementations, base station 220 may measure signal power values associated with wireless signals received from UE 210 via one or more channels. The channels may include a Physical Uplink Shared Channel (PUSCH), a Physical Uplink Control Channel (PUCCH), a Sounding Reference Signal Channel (SRS), and/or the like. Base station 220 may maintain channel quality by instructing UE 210 to increase and/or decrease transmission power associated with one or more channels (e.g., PUSCH, PUCCH, SRS, etc.). Base station 220 may transmit, to UE 210, a transmit power command (TPC), via a Physical Downlink Control Channel (PDCCH), including the instruction to increase or decrease transmission power.

In some implementations, base station 220 may include an eNB associated with the LTE network that receives traffic from and/or sends traffic to network 280 via SGW 240 and/or PGW 250. Additionally, or alternatively, one or more base stations 220 may be associated with a RAN that is not associated with an LTE network. Base station 220 may send traffic to and/or receive traffic from UE 210 via an air interface (e.g., a radio frequency (RF) signal). In some implementations, base station 220 may include a small cell base station, such as a base station of a microcell, a picocell, and/or a femtocell.

MME 230 may include one or more devices, such as one or more server devices, capable of managing authentication, activation, deactivation, and/or mobility functions associated with UE 210. In some implementations, MME 230 may perform operations relating to authentication of UE 210. Additionally, or alternatively, MME 230 may facilitate the selection of a particular SGW 240 and/or a particular PGW 250 to serve traffic to and/or from UE 210. MME 230 may perform operations associated with handing off UE 210 from a first base station 220 to a second base station 220 when UE 210 is transitioning from a first cell associated with the first base station 220 to a second cell associated with the second base station 220. Additionally, or alternatively, MME 230 may select another MME (not pictured), to which UE 210 should be handed off (e.g., when UE 210 moves out of range of MME 230).

SGW 240 may include one or more devices capable of routing packets. For example, SGW 240 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 240 may aggregate traffic received from one or more base stations 220 associated with the LTE network, and may send the aggregated traffic to network 280 (e.g., via PGW 250) and/or other network devices associated with the EPC and/or the IMS core. Additionally, or alternatively, SGW 240 may receive traffic from network 280 and/or other network devices, and may send the received traffic to UE 210 via base station 220. Additionally, or alternatively, SGW 240 may perform operations associated with handing off UE 210 to and/or from an LTE network.

PGW 250 may include one or more devices capable of providing connectivity for UE 210 to external packet data networks (e.g., other than the depicted EPC and/or LTE network), such as network 280. For example, PGW 250 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 250 may aggregate traffic received from one or more SGWs 240, and may send the aggregated traffic to network 280. Additionally, or alternatively, PGW 250 may receive traffic from network 280, and may send the traffic to UE 210 via SGW 240 and base station 220. PGW 250 may record data usage information (e.g., byte usage), and may provide the data usage information to HSS/AAA 270.

PCRF 260 may include one or more network devices or other types of communication devices. PCRF 260 may store subscriber information, such as voice call and data rate plans or quotas for subscribers. PCRF 260 may provide network control regarding service data flow detection, gating, QoS, and/or flow-based charging. Policies and rules regarding QoS may include policies and rules instructing UE 210 and/or network elements (base station 220, MME 230, SGW 240, PGW 250, etc.) to minimize packet loss, to implement a packet delay budget, to provide a guaranteed bit rate (GBR), to provide a particular latency, to reduce RF signal congestion, and/or to perform other activities associated with QoS. PCRF 260 may provide policies and rules to other network devices, such as base station 220, SGW 240, PGW 250, or the like, to implement network control. PCRF 260 may determine how a certain service data flow shall be treated, and may ensure that user plane traffic mapping and QoS is in accordance with a user's profile and/or network policies.

HSS/AAA 270 may include one or more devices, such as one or more server devices, capable of managing (e.g., receiving, generating, storing, processing, and/or providing) information associated with UE 210. For example, HSS/AAA 270 may manage subscription information associated with UE 210, such as information that identifies a subscriber profile of a user associated with UE 210, information that identifies services and/or applications that are accessible to UE 210, location information associated with UE 210, a network identifier (e.g., a network address) that identifies UE 210, information that identifies a treatment of UE 210 (e.g., quality of service information, a quantity of minutes allowed per time period, a quantity of data consumption allowed per time period, etc.), information that identifies whether UE 210 is associated with an RF access signaling usage control policy and/or an RF access signaling usage billing policy, and/or similar information. HSS/AAA 270 may provide this information to one or more other devices of environment 200 to support the operations performed by those devices.

Additionally, or alternatively, HSS/AAA 270 may perform authentication operations for UE 210 and/or a user of UE 210 (e.g., using one or more credentials), may control access, by UE 210, to a service and/or an application (e.g., based on one or more restrictions, such as time-of-day restrictions, location restrictions, single or multiple access restrictions, read/write restrictions, RF access signaling usage restrictions, etc.), may track resources consumed by UE 210 (e.g., a quantity of voice minutes consumed, a quantity of data consumed, a quantity of RF signals transmitted, a quantity of radio access bearers requested and/or established, etc.), and/or may perform similar operations.

Network 280 may include one or more wired and/or wireless networks. For example, network 280 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
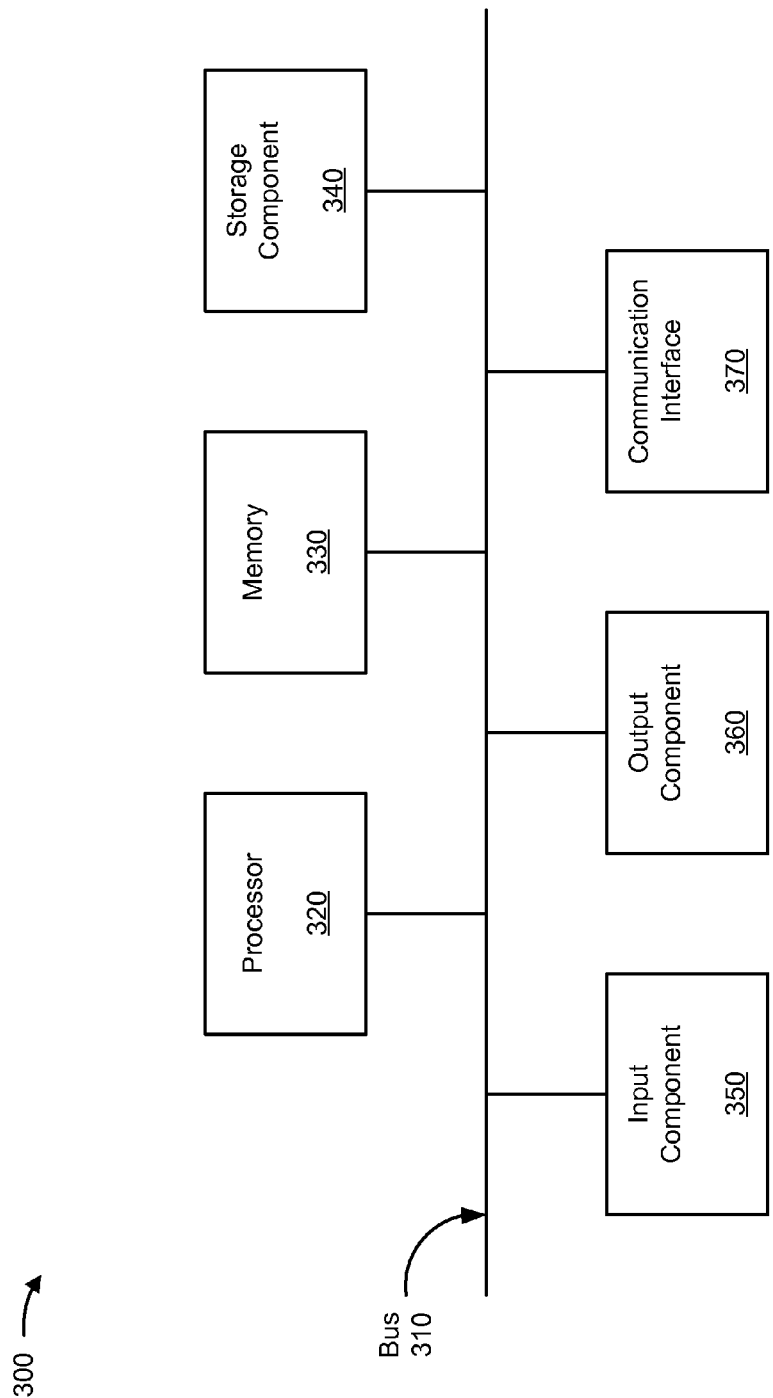
FIG. 3 is a diagram of example components of one or more devices of FIG. 2.

FIG. 3 is a diagram of example components of a device 300. Device 300 may correspond to UE 210, base station 220, MME 230, SGW 240, PGW 250, PCRF 260, and/or HSS/AAA 270. In some implementations, UE 210, base station 220, MME 230, SGW 240, PGW 250, PCRF 260, and/or HSS/AAA 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
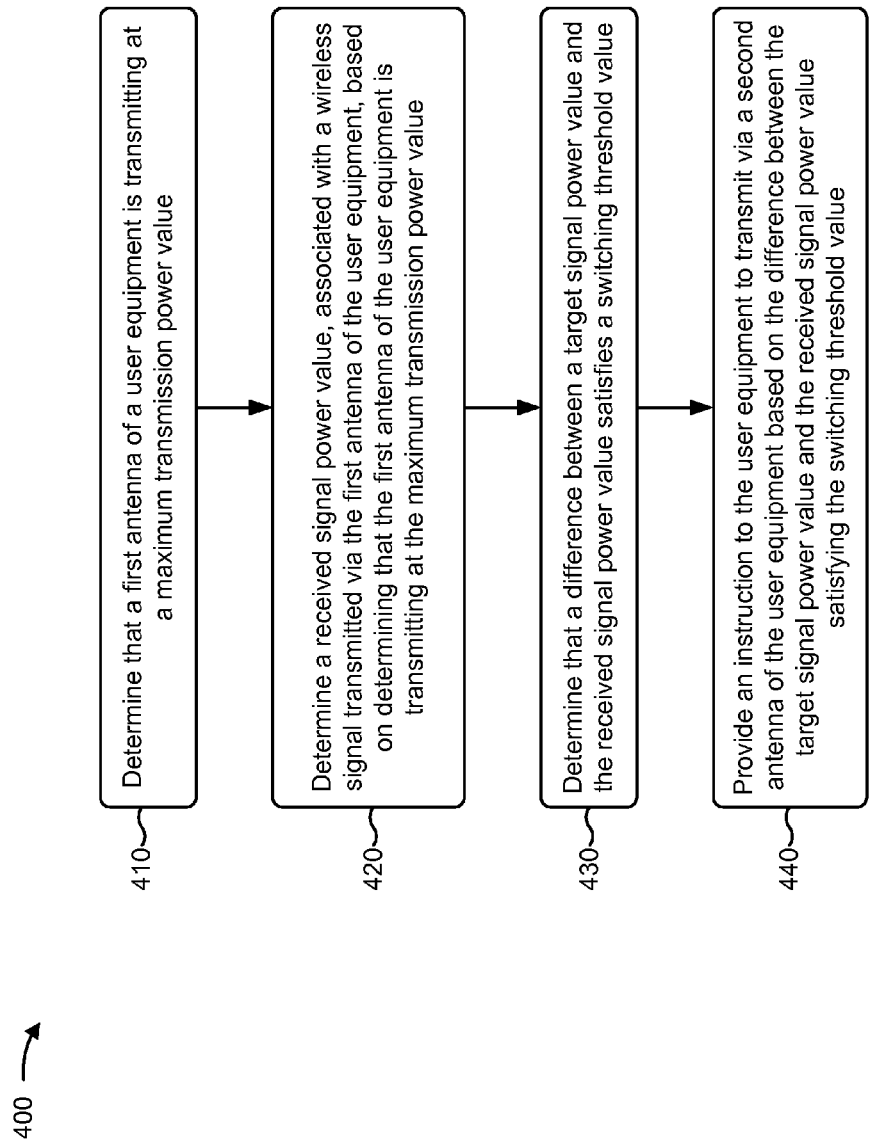
FIG. 4 is a flow chart of an example process for initiating a transmit antenna switch during uplink-downlink imbalance.

FIG. 4 is a flow chart of an example process 400 for initiating a transmit antenna switch during uplink-downlink imbalance. In some implementations, one or more process blocks of FIG. 4 may be performed by base station 220. In some implementations, one or more process blocks of FIG. 4 may be performed by another device or a group of devices separate from or including base station 220, such as UE 210, MME 230, SGW 240, PGW 250, PCRF 260, HSS/AAA 270, or the like.

As shown in FIG. 4, process 400 may include determining that a first antenna of a user equipment is transmitting at a maximum transmission power value (block 410). For example, base station 220 may determine that a first antenna of UE 210 is transmitting at a maximum transmission power value. In some implementations, the maximum transmission power value may be a maximum allowable transmission power value per the 3GPP standard (e.g., 23 dBm).

In some implementations, base station 220 may determine that the first antenna of UE 210 is transmitting at the maximum transmission power value based on a report received from UE 210. For example, base station 220 may receive a power headroom report (PHR) from UE 210, and may determine whether UE 210 is transmitting at the maximum transmission power value (e.g., 23 dBm) based on the PHR. The PHR may include information indicating an amount by which UE 210 may increase transmission power (e.g., a decibel value), such as a difference between the maximum transmission power value and a transmission power value that UE 210 is currently using to transmit wireless signals.

For example, if UE 210 is transmitting at 23 dBm, then the PHR may indicate that UE 210 does not have any available power by which to increase transmission power (e.g., a power headroom is 0 dB). In some implementations, base station 220 may determine that the first antenna of UE 210 is transmitting at the maximum transmission power value based on the PHR indicating a particular power headroom value (e.g., 0 dB). Additionally, or alternatively, base station 220 may determine that the first antenna of UE 210 is transmitting at the maximum transmission power value based on the PHR indicating a power headroom value within a particular range of headroom values (e.g., between 0 and 4 dB, inclusive).

Additionally, or alternatively, base station 220 may determine (e.g., may infer) that the first antenna of UE 210 is transmitting at the maximum transmission power value based on base station 220 transmitting, to UE 210, a threshold quantity of transmit power control (TPC) commands indicating that UE 210 is to increase a transmission power. A TPC command may instruct UE 210 to either increase or decrease transmission power on one or more uplink channels.

For example, if base station 220 receives a wireless signal from UE 210 and determines a received signal power value that is lower than a threshold value, then base station 220 may transmit a TPC command to UE 210 indicating that UE 210 is to increase a transmission power. However, if UE 210 is already transmitting at a maximum transmission power value, then UE 210 may disregard the TPC command. Therefore, base station 220 may receive another wireless signal from UE 210 with a received signal power value below the threshold value, and may transmit another TPC command to UE 210. Base station 220 may infer that the first antenna of UE 210 is transmitting at the maximum transmission power value based on transmitting a threshold quantity (e.g., two, three, four, five, etc.) of TPC commands, in some implementations.

Additionally, or alternatively, base station 220 may determine (e.g., infer) that the first antenna of UE 210 is transmitting at a maximum transmission power value by comparing received signal power values associated with successive signals interposed by a TPC command. For example, if UE 210 is transmitting at a maximum transmission power value, then base station 220 may determine that the difference between successive received signal power values does not satisfy a threshold value (e.g., the received signal power value may not increase with successive signals based on a TPC command). For example, if UE 210 is transmitting at the maximum transmission power value, then UE 210 may not increase a transmission power of the transmit antenna based on receiving a TPC command. Thus, base station 220 may compare received signal power values associated with successive signals interposed by a TPC command, and may determine that the received signal power values are the same. In this way, base station 220 may determine (e.g., infer) that UE 210 is transmitting at the maximum transmission power value (e.g., because UE 210 could not increase a transmission power value).

In some implementations, base station 220 may determine that the first antenna of UE 210 is transmitting at a maximum transmission power value based on one or more indicators. For example, base station 220 may determine that the first antenna of UE 210 is transmitting at a maximum transmission power value based on receiving a PHR and/or based on transmitting a threshold quantity of TPC commands (e.g., TPC commands that instruct UE 210 to increase a transmission power). Based on determining that the first antenna of UE 210 is transmitting at a maximum transmission power value, base station 220 may instruct UE 210 to switch to a second antenna for transmission, as described in more detail below.

As further shown in FIG. 4, process 400 may include determining a received signal power value, associated with a wireless signal transmitted via the first antenna of the user equipment, based on determining that the first antenna of the user equipment is transmitting at the maximum transmission power value (block 420). For example, base station 220 may measure a signal power parameter associated with a wireless signal transmitted via the first antenna of UE 210. The signal power parameter may represent a received signal strength indicator (RSSI), a signal-to-interference-plus-noise-ratio (SINR), or the like. In some implementations, the signal power parameter may be represented using a signal power value, such as a decibel value (e.g., an RSSI value, a SINR value, etc.).

In some implementations, base station 220 may determine received signal power values, associated with wireless signals received from UE 210 via one or more uplink channels. For example, the uplink channels may include a Physical Uplink Shared Channel (PUSCH), a Physical Uplink Control Channel (PUCCH), a Sounding Reference Signal Channel (SRS), or the like. In some implementations, base station 220 may determine an average received signal power value associated with wireless signals received via a particular uplink channel (e.g., the PUSCH). Additionally, or alternatively, base station 220 may determine an average received signal power value associated with wireless signals received via two or more uplink channels (e.g., the PUSCH, PUCCH, and/or SRS).

In some implementations, base station 220 may compare received signal power values with a target signal power value, as described in more detail below. For example, if an uplink path loss and a downlink path loss are balanced (e.g., equal), then base station 220 may receive wireless signals from UE 210 at a target signal power value, as shown by the following expression:

$$\Delta P = P_{Target} - P_{Received} = UL_{path\ loss} - DL_{path\ loss}$$

In the above expression, $\Delta P$ may represent a difference between a target signal power value (e.g., $P_{Target}$) and a received signal power value (e.g., $P_{Received}$). If $\Delta P$ is zero, then base station 220 may receive wireless signals from UE 210 at the target signal power value (e.g., an uplink path loss and a downlink path loss are balanced). However, if the transmit antenna of UE 210 becomes obstructed (e.g., by a user of UE 210), then an uplink path loss may become greater than a downlink path loss. As a result, base station 220 may receive wireless signals at a signal power value that is less than the target signal power value.

In this way, base station 220 may determine (e.g., infer) that an uplink path loss and downlink path loss are imbalanced (e.g., not equal), and may instruct UE 210 to increase a transmission power of the transmit antenna (e.g., via a TPC command). However, if UE 210 is transmitting at the maximum transmission power value, then base station 220 may instruct UE 210 to switch transmit antennas, as described in more detail below.

As further shown in FIG. 4, process 400 may include determining that a difference between a target signal power value and the received signal power value satisfies a switching threshold value (block 430). For example, base station 220 may compare the received signal power value and a target signal power value, and may determine that a difference between the target signal power value and the received signal power value satisfies a switching threshold value. In some implementations, the switching threshold value may be a decibel value that is greater than zero. Base station 220 may be configured with the switching threshold value, in some implementations. Additionally, or alternatively, base station 220 may receive the switching threshold value from another device.

In some implementations, base station 220 may determine, by using a mathematical operation, that a difference between the target signal power value and the received signal power value satisfies the switching threshold value. In some implementations, base station 220 may subtract the received signal power value from the target signal power value to determine whether a difference between the target signal power value and the received signal power value satisfies the switching threshold value. Additionally, or alternatively, base station 220 may perform another mathematical operation using the target signal power value and the received signal power value, and may determine that a resulting value satisfies the switching threshold value (e.g., may divide the values, may multiply the received signal power value by a factor, or the like).

The target signal power value may include a signal power value required to maintain a particular channel quality and/or fidelity. For example, the target signal power value may include a signal power value required for a particular service (e.g., a VoLTE service) or a particular quality of service. In some implementations, the target signal power value may be a decibel value (e.g., an RSSI value, a SINR value, etc.). In some implementations, if the received signal power value is lower than the target signal power value, then communication issues may occur. For example, UE 210 may experience dropped calls, reduced data throughput, packet loss, dropped connections, and/or the like.

In some implementations, base station 220 may be configured with the target signal power value. Additionally, or alternatively, base station 220 may determine the target signal power value based on estimating an uplink path loss, a downlink path loss, or the like. In accordance with the Third Generation Partnership Project (3GPP) standard, UE 210 may transmit wireless signals at a maximum value of 23 dBm. In some implementations, the target signal power value may be less than or equal to 23 dBm. For example, the target signal power value may be determined by performing a mathematical operation using an initial uplink transmit power value of 23 dBm and an attenuation value (e.g., an estimated uplink path loss value).

In some implementations, the switching threshold value may be a decibel value that is greater than zero. For example, base station 220 may subtract the received signal power value from the target signal power value, and may determine a difference that is greater than zero. The switching threshold value may be a value that, when subtracted from the target signal power value, represents a signal power value that may result in communication issues associated with a particular service (e.g., VoLTE service). For example, received signal power values lower than the target signal power value by more than the switching threshold value may result in communication issues, such as dropped calls, low data throughput, packet loss, dropped connections, etc.

In some implementations, base station 220 may determine that a difference between the target signal power value and a received signal power value satisfies the switching threshold value for a threshold amount of received wireless signals (e.g., the difference satisfies the switching threshold for five consecutive or non-consecutive received signal power values). Additionally, or alternatively, base station 220 may determine that an average difference between the target signal power value and received signal power values satisfies the switching threshold value (e.g., averaged across multiple received signal power values). For example, base station 220 may receive a group of wireless signals from UE 210, and may determine received signal power values for each of the group of wireless signals. For each of the group of wireless signals, base station 220 may determine a difference between the target signal power value and a corresponding received signal power value.

In some implementations, base station 220 may average the differences between the target signal power value and the received signal power values. For example, base station 220 may perform a mathematical operation on the differences between received signal power values and the target signal power value, and may determine an average difference between the target signal power value and received signal power values (e.g., a mean difference, a median difference, etc.). Base station 220 may determine whether an average difference between the target signal power value and received signal power values satisfies the switching threshold value. In some implementations, base station 220 may determine an average difference between received signal power values and the target signal power value based on receiving a particular quantity of wireless signals from UE 210 during a particular time period.

In some implementations, base station 220 may determine that an average difference between the target signal power value and received signal power values, associated with wireless signals received via an uplink channel (e.g., the PUSCH), satisfies the switching threshold value. Additionally, or alternatively, base station 220 may determine that an average difference between the target signal power value and received signal power values, associated with wireless signals received on multiple uplink channels, satisfies the switching threshold value. For example, base station 220 may determine an average difference between the target signal power value and received signal power values for two or more of the PUSCH, the PUCCH, the SRS, or the like. In some implementations, base station 220 may determine an average difference based on a combination of average differences for the PUSCH, the PUCCH, the SRS, or the like.

In some implementations, base station 220 may determine that differences between received signal power values, associated with wireless signals received on multiple uplink channels, and the target signal power value satisfy the switching threshold value. For example, base station 220 may determine that differences between the target signal power value and received signal power values satisfy the switching threshold value on a particular combination of uplink channels (e.g., the PUSCH and the PUCCH, or the like). Additionally, or alternatively, base station 220 may determine whether differences between the target signal power value and received signal power values satisfy the switching threshold value for a threshold quantity of uplink channels.

In this way, by comparing received signal power values, associated with one or more uplink channels, with the target signal power value, base station 220 may determine and/or infer more accurately whether UE 210 is transmitting at a maximum transmission power and/or is obstructed (e.g., by a user).

Based on determining that the difference between the target signal power value and the received signal power value satisfies the switching threshold value, base station 220 may provide an instruction to UE 210 to transmit via a second antenna, as described in more detail below. For example, if base station 220 determines that UE 210 is transmitting at the maximum transmission power value and that the switching threshold value is satisfied, then base station 220 may infer that an uplink-downlink imbalance exists. Moreover, an uplink-downlink imbalance situation may exist where UE 210 is located near a cell edge and/or the first antenna of UE 210 is being obstructed (e.g., by a user of UE 210). In this way, base station 220 may initiate a transmit antenna switch to improve channel quality, improve data throughput, etc.

For example, if the difference between the target signal power value and a received signal power value satisfies the switching threshold value, then communication issues such as packet loss, reduced data throughput, dropped calls, poor channel quality, dropped connections, etc. may arise. Base station 220 may attempt to mitigate communication issues by instructing UE 210 to increase a transmission power associated with the first antenna. However, the first antenna of UE 210 may be obstructed and/or may already be transmitting at a maximum transmission power value (e.g., 23 dBm). Thus, base station 220 may initiate a switch to a second antenna, as described below.

As further shown in FIG. 4, process 400 may include providing an instruction to the user equipment to transmit via a second antenna of the user equipment based on determining that the difference between the target signal power value and the received signal power value satisfies the switching threshold value (block 440). For example, base station 220 may transmit, to UE 210, a wireless signal, via the PDCCH, including an instruction for UE 210 to transmit via a different antenna.

In some implementations, UE 210 may include a first antenna (e.g., a Tx/Rx antenna) and a second antenna (e.g., another Tx/Rx antenna). For example, the first antenna may have a different design and/or configuration than the second antenna. Moreover, in some implementations, the first antenna may be located in a different position in UE 210 than the second antenna. For example, the first antenna may be located near the top of UE 210, and the second antenna may be located near the bottom of UE 210. Because of the difference in positions of the antennas, the first antenna may be obstructed (e.g., by a user of UE 210), whereas the second antenna may remain unobstructed, or vice versa. Thus, for example, the first antenna and the second antenna may transmit wireless signals associated with different uplink path loss values, which may impact a received signal power value of wireless signals received by base station 220 (e.g., during uplink-downlink imbalance).

In some implementations, UE 210 may use either the first antenna or the second antenna to transmit wireless signals (e.g., both antennas may have transmission capability). Further, UE 210 may receive wireless signals via both the first antenna and the second antenna. Additionally, or alternatively, UE 210 may transmit wireless signals via both the first antenna and the second antenna. In some implementations, the first antenna and the second antenna may transmit the same wireless signal. In some implementations, UE 210 may include more than two antennas. In such cases, UE 210 may receive and/or transmit wireless signals via one or more of the antennas. Further, UE 210 may determine signal power values for one or more of these antennas.

In some implementations, UE 210 may select a different transmit antenna based on receiving the instruction from base station 220 to transmit via a different antenna. In cases where UE 210 has two antennas, UE 210 may transmit via the second antenna based on receiving the instruction to switch transmit antennas. In cases where UE 210 has more than two antennas, UE 210 may determine a downlink path loss associated with one or more antennas. For example, UE 210 may select an antenna associated with the lowest downlink path loss.

In some implementations, UE 210 may transmit via some or all antennas based on receiving the instruction from base station 220 to transmit via a different antenna. For example, UE 210 may transmit via the first antenna and the second antenna (e.g., where UE 210 includes two antennas). In cases where UE 210 includes more than two antennas, UE 210 may transmit via some or all of the antennas. In some implementations, UE 210 may transmit the same wireless signal via two or more antennas.

In some implementations, base station 220 may wait a threshold amount of time before providing, to UE 210, another instruction to switch transmit antennas. For example, in cases where UE 210 has two antennas, base station 220 may be prevented from providing, to UE 210, an instruction to switch back to the first antenna until the threshold amount of time lapses. In cases where UE 210 includes more than two antennas, base station 220 may be prevented from providing, to UE 210, an instruction to switch back to a transmit antenna that UE 210 was previously using (e.g., associated with a previous instruction) until the threshold amount of time lapses. In this way, base station 220 may prevent repeated switching between transmit antennas if multiple transmit antennas are associated with weak signals.

In some implementations, base station 220 may perform another technique to improve service coverage based on the switching threshold value being satisfied for multiple antennas (e.g., both antennas, where UE 210 has two antennas). For example, base station 220 may perform another technique rather than instructing UE 210 to switch transmit antennas. Further, if UE 210 includes a single transmit antenna, then base station 220 may perform another technique to improve service coverage. For example, base station 220 may initiate a handover to another base station 220, or the like.

In this way, base station 220 may detect communication issues associated with a first antenna of UE 210 (e.g., during uplink-downlink imbalance), and may initiate a switch to a second antenna, thereby increasing channel quality and improving service coverage (e.g., VoLTE service).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may allow a base station to detect communication issues associated with a transmit antenna of a UE, and may allow the base station to instruct the UE to switch transmit antennas. The UE may establish a more robust communication link with a network by switching to a different antenna that is associated with a lower uplink path loss. In this way, the UE and/or the network may save resources by avoiding poor communication conditions that might result in dropped calls, low data throughput, packet loss, dropped connections, etc. Further, the UE may save memory, processor, and/or battery resources by switching antennas and/or by decreasing transmission power.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
one or more memories; and
one or more processors, communicatively coupled to the one or more memories, to:
determine that a first antenna of a user equipment is transmitting at a maximum transmission power value;
determine, after determining that the first antenna of the user equipment is transmitting at the maximum transmission power value, a received signal power value associated with a wireless signal transmitted via the first antenna of the user equipment;
compare a target signal power value and the received signal power value;
determine that a switching threshold value is satisfied based on comparing the target signal power value and the received signal power value; and
provide, to the user equipment, an instruction to transmit via a second antenna of the user equipment based on determining that the switching threshold value is satisfied.

2. The base station of claim 1, where the one or more processors are further to:

receive a power headroom report from the user equipment; and where the one or more processors, when determining that the first antenna of the user equipment is transmitting at the maximum transmission power value, are to:

determine that the first antenna of the user equipment is transmitting at the maximum transmission power value based on the power headroom report.

3. The base station of claim 1, where the one or more processors are further to:

determine that a threshold quantity of transmit power control commands have been transmitted to the user equipment; and where the one or more processors, when determining that the first antenna of the user equipment is transmitting at the maximum transmission power value, are to:

determine that the first antenna of the user equipment is transmitting at the maximum transmission power value based on determining that the threshold quantity of transmit power control commands have been transmitted to the user equipment.

4. The base station of claim 1, where the instruction includes a particular instruction to switch from transmitting via the first antenna to transmitting via the second antenna.

5. The base station of claim 1, where the one or more processors are further to:

determine a plurality of received signal power values associated with a plurality of wireless signals transmitted via the first antenna of the user equipment, the plurality of received signal power values including the received signal power value, and the plurality of wireless signals including the wireless signal;

compare the target signal power value and the plurality of received signal power values; and where the one or more processors, when determining that the switching threshold value is satisfied, are to:

determine that the switching threshold value is satisfied based on comparing the target signal power value and the plurality of received signal power values.

6. The base station of claim 5, where the plurality of received signal power values includes:

a first received signal power value associated with a first wireless signal received via a first uplink channel, and a second received signal power value associated with a second wireless signal received via a second uplink channel that is different from the first uplink channel.

7. The base station of claim 1, where the one or more processors, when determining that the first antenna of the user equipment is transmitting at the maximum transmission power value, are to:

infer that the first antenna of the user equipment is transmitting at the maximum transmission power value.

8. A non-transitory computer-readable medium storing instructions, the instructions comprising:

one or more instructions that, when executed by one or more processors of a base station, cause the one or more processors to:

determine that a first antenna of a user equipment is transmitting at a maximum transmission power value;

determine, after determining that the first antenna of the user equipment is transmitting at the maximum transmission power value, a received signal power value associated with a wireless signal transmitted via the first antenna of the user equipment;

compare the received signal power value and a target signal power value;

determine that a switching threshold value is satisfied based on comparing the received signal power value and the target signal power value; and provide, to the user equipment, a particular instruction to transmit via a second antenna of the user equipment based on determining that the switching threshold value is satisfied, the second antenna being different from the first antenna.

9. The non-transitory computer-readable medium of claim 8, where the one or more instructions, when executed by the one or more processors, further cause the one or more processors to:

receive a power headroom report associated with the user equipment; and where the one or more instructions, that cause the one or more processors to determine that the first antenna of the user equipment is transmitting at the maximum transmission power value, cause the one or more processors to:

determine that the first antenna of the user equipment is transmitting at the maximum transmission power value based on the power headroom report.

10. The non-transitory computer-readable medium of claim 8, where the particular instruction instructs the user equipment to transmit via the second antenna and via the first antenna.

11. The non-transitory computer-readable medium of claim 8, where the received signal power value is a first received signal power value;

where the one or more instructions, when executed by the one or more processors, further cause the one or more processors to:

transmit a transmit power control command to the user equipment;

determine a second received signal power value after transmitting the transmit power control command; and where the one or more instructions, that cause the one or more processors to determine that the first antenna of the user equipment is transmitting at the maximum transmission power value, cause the one or more processors to:

determine that the first antenna of the user equipment is transmitting at the maximum transmission power value based on the first received signal power value and the second received signal power value.

12. The non-transitory computer-readable medium of claim 8, where the one or more instructions, when executed by the one or more processors, further cause the one or more processors to:

determine one or more received signal power values associated with the first antenna, the one or more received signal power values being different from the received signal power value; and determine an average value based on the received signal power value and the one or more received signal power values; and where the one or more instructions, that cause the one or more processors to determine that the switching threshold value is satisfied, cause the one or more processors to:

determine that the switching threshold value is satisfied based on the average value.

13. The non-transitory computer-readable medium of claim 8, where the wireless signal is received via at least one of:
   a physical uplink shared channel (PUSCH);
   a physical uplink control channel (PUCCH); or
   a sounding reference signal (SRS) channel.

14. The non-transitory computer-readable medium of claim 8, where the target signal power value includes a signal power value required for a particular service or a particular quality of service.

15. A method, comprising:
   determining, by a base station, that an antenna of a user equipment is transmitting at a maximum transmission power value;
   determining, by the base station and after determining that the antenna of the user equipment is transmitting at the maximum transmission power value, a received signal power value associated with a wireless signal transmitted from the antenna of the user equipment;
   comparing, by the base station, the received signal power value and a target signal power value;
   determining, by the base station, that a switching threshold value is satisfied based on comparing the received signal power value and the target signal power value; and
   providing, by the base station and to the user equipment, an instruction to transmit via a different antenna of the user equipment based on determining that the switching threshold value is satisfied.

16. The method of claim 15, further comprising:
   receiving a power headroom report from the user equipment; and
   where determining that the antenna of the user equipment is transmitting at the maximum transmission power value comprises:
       determining that the antenna of the user equipment is transmitting at the maximum transmission power value based on the power headroom report.

17. The method of claim 15, further comprising:
   determining that a threshold quantity of transmit power control commands have been transmitted to the user equipment; and
   where determining that the antenna of the user equipment is transmitting at the maximum transmission power value comprises:
       inferring that the antenna of the user equipment is transmitting at the maximum transmission power value based on determining that the threshold quantity of transmit power control commands have been transmitted.

18. The method of claim 15, where the received signal power value comprises an average of a plurality of received signal power values associated with the antenna of the user equipment.

19. The method of claim 15, where the received signal power value is a first received signal power value associated with a first uplink channel;
   where the target signal power value is a first target signal power value;
   where the method further comprises:
       determining a second received signal power value associated with the antenna of the user equipment and associated with a second uplink channel that is different from the first uplink channel;
       comparing the second received signal power value and a second target signal power value; and
   where determining that the switching threshold value is satisfied comprises:
       determining that the switching threshold value is satisfied based on comparing the second received signal power value and the second target signal power value and based on comparing the first received signal power value and the first target signal power value.

20. The method of claim 15, where the antenna is a first antenna and the different antenna is a second antenna;
   where providing the instruction comprises:
       transmitting, to the user equipment, a particular instruction to switch from the first antenna to the second antenna.

* * * * *